Patented May 31, 1927.

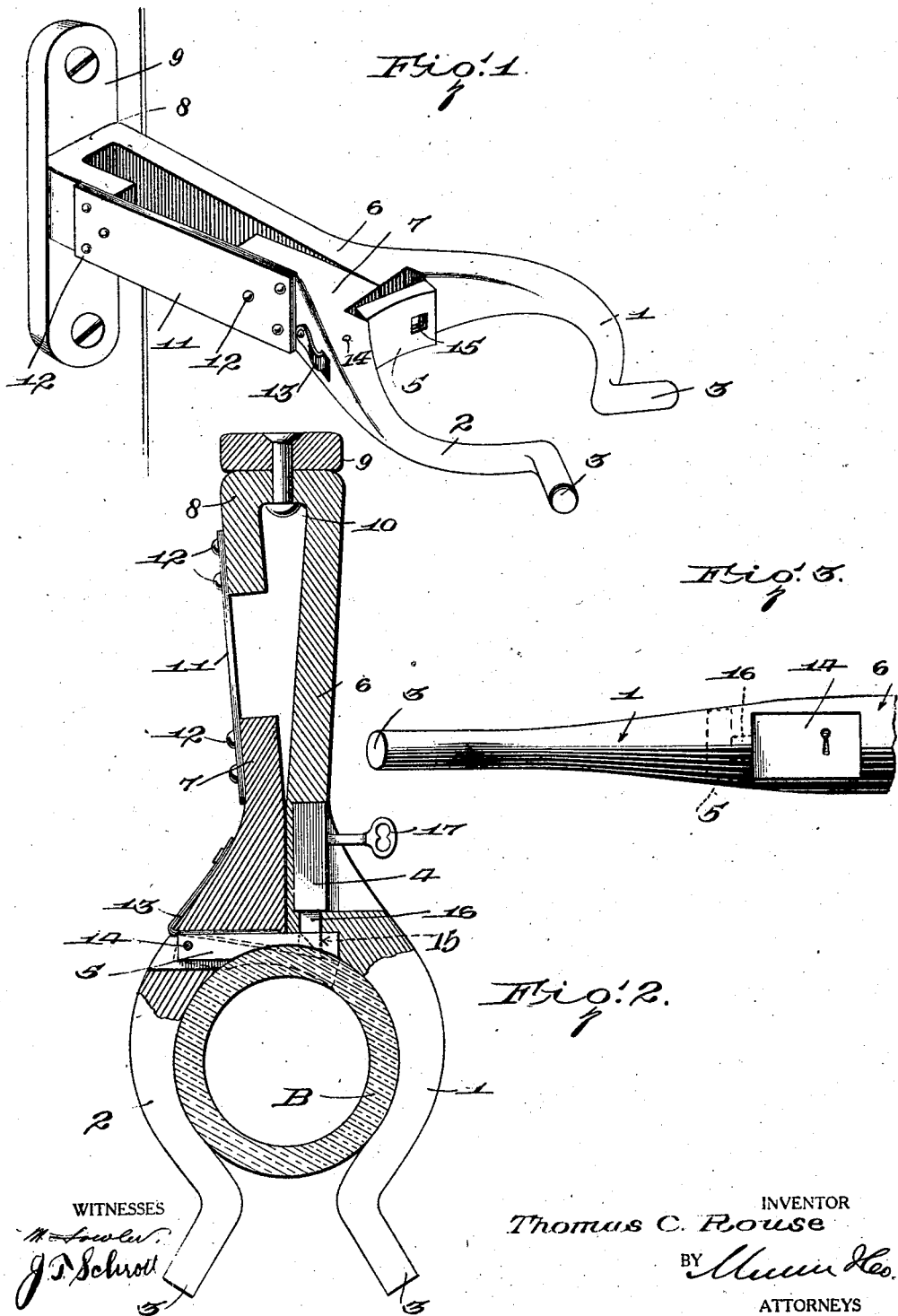

1,630,409

UNITED STATES PATENT OFFICE.

THOMAS C. ROUSE, OF WASHINGTON, DISTRICT OF COLUMBIA.

MILK-BOTTLE HOLDER.

Application filed December 8, 1925. Serial No. 74,092.

This invention relates to improvements in milk bottle holders, and it consists of the constructions, combinations and arrangements herein described and claimed.

An object of the invention is to provide a milk bottle holder having a latch which automatically secures the jaws in the closed position around the neck of the bottle when the latter is inserted between the jaws, a feature of the holder being that the jaws always tend to remain in the closed position so that the milk bottle will not drop out when the lock bolt with which the latch coacts is withdrawn.

Other objects and advantages appear in the following specification, reference being had to the accompanying drawings, in which Figure 1 is a perspective view of the milk bottle holder showing how it appears in readiness to receive the milk bottle neck.

Figure 2 is a central horizontal section (parts in elevation) of the holder, illustrating the action of the milk bottle neck in automatically securing the jaws in the closed position when the milk bottle neck is inserted.

Figure 3 is a detail side elevation of a portion of the holder illustrating the key-lock.

In carrying out the invention, provision is made of jaws 1 and 2, which, at the free extremities, are turned outwardly at 3 to receive the neck of the milk bottle B when the latter is inserted. The jaws are so shaped or curved that when looking down upon them, (Fig. 2) they describe a substantial circle, the obvious purpose being to provide a snug fit around the bottle neck. The extremities of the jaws are preferably circular in cross section, but the cross sectional portions merge into heavier portions which carry the lock 4 and latch 5 of the holder.

The foregoing heavier portions of the jaws respectively comprise an arm 6 and heel 7. The former is relatively long and includes a bent or hook end 8 at which the base plate 9 is conveniently secured by means of a rivet 10. The latter is relatively short, but is connected with the extremity of the hook end 8 by means of a stout leaf spring 11. The leaf spring is secured at its extremities to the hook end 8 and to the heel 7 by rivets 12 or other suitable means. The purpose of the leaf spring is to furnish the necessary resiliency which the holder requires, and to keep the jaws closed.

From the foregoing description of the various parts of the device, it is apparent that the jaw 1 is stationary by virtue of the attachment of the arm 6 to the base plate 9, and the jaw 2 is relatively movable by virtue of being carried by the leaf spring 11. The base plate 9 is secured to any desired support.

The milk bottle holder is never locked until a milk bottle neck is inserted between the jaws 1 and 2, and the pressure of the bottle B against the latch 5 then serves to secure the jaws in the closed position (Fig. 2). A spring 13 presses against the rear of the latch 5 thereby tending to swing the latch forwardly upon its pivot 14 into what may be regarded as the receiving position (Figs. 1 and 2). The latch 5 has an opening 15 by which the bolt 16 of the lock 4 is receivable.

So long as the milk bottle holder is not occupied, the spring 13 keeps the latch 5 pressed forwardly in the receiving position and out of reach of the bolt 16. Although the jaws 1 and 2 are normally held closed (Fig. 2) by the spring 11, they are, nevertheless, capable of being opened, for example, by the milk bottle neck when inserted between the diverging ends 3. The milk bottle neck is inserted and presses against the latch 5. This pressure forces the latch over the lock-bolt 16. The milk bottle holder is now automatically locked, and it requires the use of a key 17 to retract the bolt 16 before the jaw 2 can be swung away from the jaw 1 for the release of the milk bottle.

But assuming that the authorized person merely turns the key 17 to retract the bolt 16: The milk bottle will not drop because the normal tendency of the jaws to remain closed supplemented by the support of the usual heavy rim at the mouth of the milk bottle upon the jaws serve to hold the milk bottle in place until such person takes hold of the milk bottle and pulls it out.

Mention has been made of the jaws 1 and 2 being shaped so as to describe a substantial circle. This statement has reference mainly to the interior contour of the jaws because this interior contour should conform to the milk bottle neck as nearly as may be. In order to carry out the idea of the substantially circular contour the latch 5 is either so shaped or located in such position that when it occupies the locked position it assists in completing the foregoing internal circle. In other words, it requires the rounded surface of the milk bottle neck to press the latch 5 back into locking engagement with the bolt 16, and the latch is so shaped as to complete the substantially internal formation of the jaws so as to adequately support the bottle.

The operation is readily understood. The leaf spring 11 tends to always keep the relatively movable jaw 2 closed against the stationary jaw 1, thereby serving to support the milk bottle in the holder even after the rightful owner has turned the key 17 to retract the bolt 16.

The milk bottle holder is never secured or locked until a milk bottle neck has been inserted between the jaws. This is true regardless of whether the bolt 16 of the lock 4 is extended or retracted. The spring 13 keeps the latch 5 in the forward position and away from the bolt 16. It is therefore clear that the movable jaw 2 may be swung away from the jaw 1 when the holder is unoccupied.

However, upon inserting a bottle neck between the jaws the pressure of the bottle neck against the latch 5 moves the latch from the dotted line position to the full line position in Figure 2, superimposing it upon the extended bolt 16. It is now clear that the jaw 2 cannot be moved away because it is held by the latch 5 and bolt 16. A turn of the key 17 releases the latch so that the bottle can be taken out.

While the construction and arrangement of the improved milk bottle holder is that of a generally preferred form, obviously modifications and changes may be made without departing from the spirit of the invention or the scope of the claims.

I claim:—

1. A milk bottle holder comprising a pair of jaws, and a resilient element constituting the support of one of the jaws and additionally tending to hold the jaws in the closed position to thereby provide the sole support for a milk bottle.

2. A milk bottle holder comprising a stationary jaw, a relatively movable jaw, means supporting the latter jaw so as to be movable but tending to keep the jaws in engagement to furnish support for a milk bottle, an engageable lock element carried by one of the jaws, a complementary latch carried by the other jaw, and resilient means holding the latch from said lock element to normally keep the holder in the unlocked position, said latch being moved into engagement with the lock element upon insertion of a bottle neck thereby preventing opening of the jaws while the holder is occupied.

3. A milk bottle holder comprising an arm having a hook end and a jaw, means including a plate by which the arm is carried and by which the milk bottle holder is mounted thereby rendering said jaw stationary, a complementary jaw, means including a resilient element furnishing the mounting of the complementary jaw upon said hook end thereby rendering the complementary jaw relatively movable, locking means carried by the stationary jaw including a key-operated bolt, a latch carried by the complementary jaw having an opening to receive the bolt, and resilient means normally pressing the latch away from the bolt while the holder is unoccupied, said latch being displaced when a milk bottle neck is inserted between the jaws so that the bolt enters the opening and prevents opening of the jaws while the holder is occupied.

4. A milk bottle holder comprising a stationarily held jaw, a lock bolt carried by said jaw, a relatively movable jaw, means carrying said jaw but tending to keep it pressed against the stationary jaw thereby keeping the jaws closed, a latch carried by the relatively movable jaw and extending in a direction crosswise of said lock bolt, and resilient means pressing said latch in a forward direction in reference to the jaws and normally away from said lock bolt to prevent engagement until a milk bottle neck is inserted between the jaws whereupon said latch is displaced to receive the lock bolt and secure the jaws together.

THOMAS C. ROUSE.